(12) United States Patent
Harris, Jr. et al.

(10) Patent No.: US 10,683,397 B2
(45) Date of Patent: Jun. 16, 2020

(54) REMEDIATION OF AGGLOMERATED FLOW IMPROVERS

(71) Applicant: LIQUIDPOWER SPECIALTY PRODUCTS INC.

(72) Inventors: William F. Harris, Jr., Palm Harbor, FL (US); Ray L. Johnston, Ponca City, OK (US)

(73) Assignee: LIQUIDPOWER SPECIALTY PRODUCTS INC., Houston, TX (US)

( * ) Notice: Subject to any disclaimer, the term of this patent is extended or adjusted under 35 U.S.C. 154(b) by 205 days.

(21) Appl. No.: 15/275,701

(22) Filed: Sep. 26, 2016

(65) Prior Publication Data

US 2017/0009027 A1 Jan. 12, 2017

Related U.S. Application Data

(63) Continuation of application No. 13/194,409, filed on Jul. 29, 2011, now abandoned.

(60) Provisional application No. 61/371,976, filed on Aug. 9, 2010.

(51) Int. Cl.
*C08J 3/12* (2006.01)
*C08F 2/00* (2006.01)

(52) U.S. Cl.
CPC .............. *C08J 3/12* (2013.01); *C08F 2/005* (2013.01); *C08J 2300/00* (2013.01)

(58) Field of Classification Search
CPC .................................. C08J 3/12; C08F 2/005
USPC ........................................ 523/175, 319, 322
See application file for complete search history.

(56) References Cited

U.S. PATENT DOCUMENTS

| 6,894,088 B2 * | 5/2005 | Motier | C08J 3/12 523/175 |
|---|---|---|---|
| 2004/0130968 A1 | 7/2004 | Bach et al. | |
| 2006/0276566 A1 | 12/2006 | Mathew et al. | |
| 2009/0111714 A1 | 4/2009 | Burden et al. | |

FOREIGN PATENT DOCUMENTS

| WO | 2004085519 A1 | 10/2004 |
|---|---|---|
| WO | 2006132995 A2 | 12/2006 |

\* cited by examiner

*Primary Examiner* — Edward J Cain
(74) *Attorney, Agent, or Firm* — Patterson + Sheridan, LLP

(57) ABSTRACT

The present embodiment can teach a method of feeding to a materials processor a mixture containing an agglomerated drag reducer. The mixture is then homogenized to produce a remediated drag reducer. The maximum particle size diameter of the agglomerated drag reducing polymer is at least 5% larger than the maximum particle diameter of the remediated drag reducer.

16 Claims, 1 Drawing Sheet

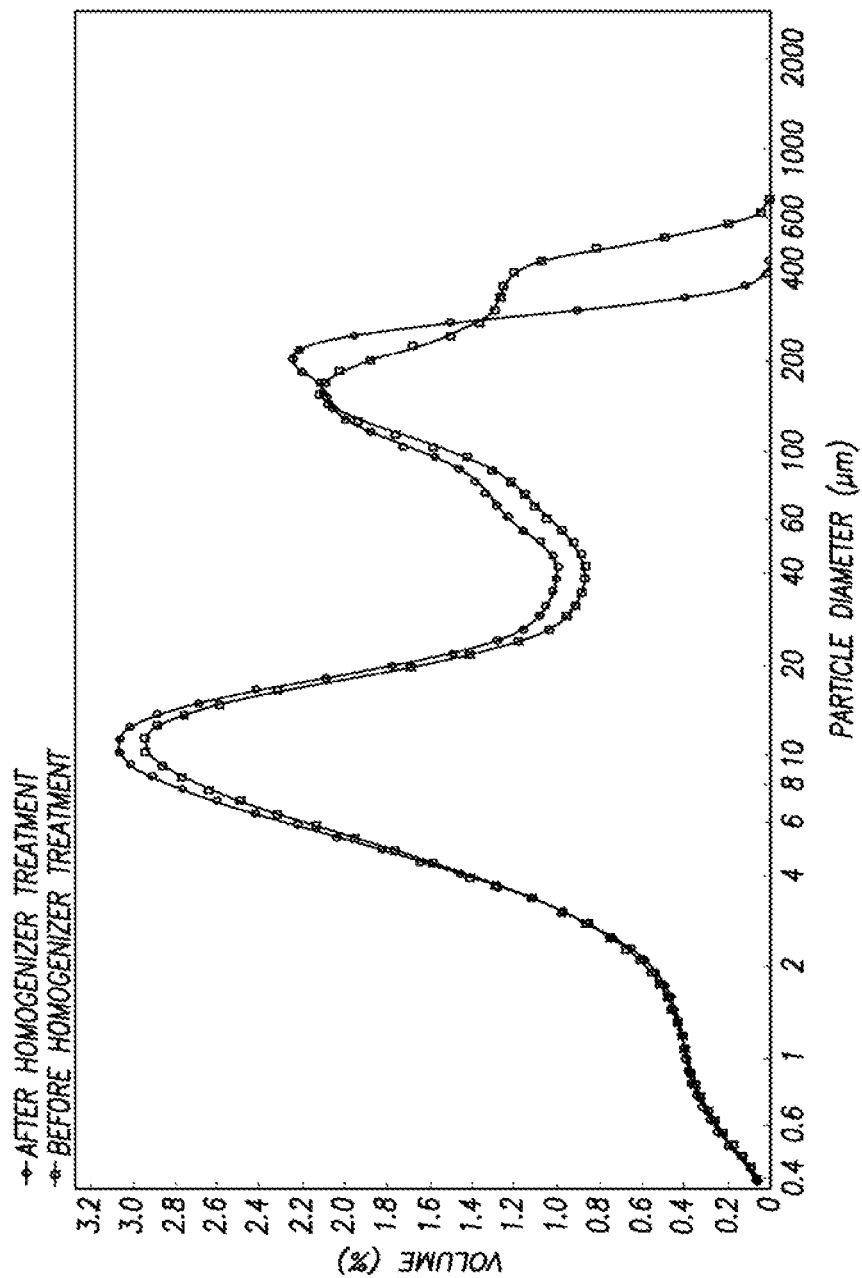

REMEDIATION OF AGGLOMERATED FLOW IMPROVERS

CROSS-REFERENCE TO RELATED APPLICATIONS

This application is a continuation of application Ser. No. 13/194,409 filed on Jul. 29, 2011, which claims the benefit of and priority to U.S. Provisional Application Ser. No. 61/371,976 filed Aug. 9, 2010, entitled "Remediation of Agglomerated Flow Improvers," which is hereby incorporated by reference in its entirety.

STATEMENT REGARDING FEDERALLY SPONSORED RESEARCH OR DEVELOPMENT

None.

FIELD OF THE INVENTION

A method of remediating agglomerated flow improvers.

BACKGROUND OF THE INVENTION

Sales of drag reducer are often made in large quantities and shipped to customers. Extensive delays and temperature fluctuations during shipping or storing of the drag reducers will result in drag reducers agglomerated to a point where it is unusable. Often times simply filtering the agglomerated drag reducers is not an effective solution since the filter becomes easily clogged with lumps of agglomerated drag reducers. Furthermore, if the agglomerated drag reducers are simply injected into the pipelines they can clog the injection pumps and cause costly delays.

There exists a need for a method of remediating agglomerated flow improvers.

BRIEF SUMMARY OF THE DISCLOSURE

The present embodiment can teach a method of feeding to a materials processor a mixture containing an agglomerated drag reducer. The mixture is then homogenized to produce a remediated drag reducer. The maximum particle size diameter of the agglomerated drag reducing polymer is at least 5% larger than the maximum particle diameter of the remediated drag reducer.

In an alternate embodiment the present method can teach a method of feeding to a materials processor a mixture containing an agglomerated drag reducer and at least one liquid. The mixture is then homogenized to produce a remediated drag reducer. The maximum particle size diameter of the agglomerated drag reducing polymer is at least 5% larger than the maximum particle diameter of the remediated drag reducer.

In yet another embodiment a composition is taught of a remediated drag reducer prepared by the process of feeding to a material processor a mixture of an agglomerated drag reducer and at least one liquid. The maximum particle size diameter of the agglomerated drag reducing polymer is at least 5% larger than the maximum particle diameter of the remediated drag reducer. In this embodiment the agglomerated drag reducing polymer was incapable of flowing without clogging the injection pump.

BRIEF DESCRIPTION OF THE DRAWINGS

A more complete understanding of the present invention and benefits thereof may be acquired by referring to the follow description taken in conjunction with the accompanying drawings in which:

FIG. 1 depicts a particle size distribution overlay of the agglomerated drag reducer and the remediated drag reducer.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

The present embodiment can teach a method of feeding to a materials processor a mixture containing an agglomerated drag reducer. The mixture is then homogenized to produce a remediated drag reducer. The maximum particle size diameter of the agglomerated drag reducing polymer is at least 5% larger than the maximum particle diameter of the remediated drag reducer.

In one embodiment the material processor can be any processor capable of homogenizing the agglomerated drag reducer. Examples of material processors capable of homogenizing include methods of mechanical shear, ultrasonic and milling. Mechanical shear devices such as high shear devices are commonly used in this embodiment. These methods of homogenizing the drag reducing can be done either in-line of the injection pump or done in bulk. The time frame of homogenizing the agglomerated drag reducer can be dependant upon the amount of agglomeration of the drag reducer.

In an alternate embodiment the materials processor is a high shear blending within a mixing vessel with a variety of agitators that may include: a rotor, a stator, and an open agitator with sharp edges or a cowls type agitator capable of shearing a particle into a smaller particle size or break up agglomerates of cohesive particles.

In yet another embodiment the materials processor can be an inline mixer that could also have an impeller with three helical blades rotating at high speed inside a matching, tubular housing. This rotating impeller creates a negative pressure differential, centrifugal-shoveling and positive axial thrust which draws materials into intensive shear zones. The centrifugal force abruptly changes the direction of the materials and drives them against the inner surface of the toothed cylindrical liner. Sharply angled teeth on the edges of the impeller blades shear the materials and force them through a tortuous path.

Other inline materials processor include a rotor stator apparatus such as a series of concentric rings or chambers. As the medium enters the center chamber, it is compressed at a rate of up to 10 bar then the chamber opens, and the suspension particle "explodes" outward into the next chamber. A series of nozzles breaks down the medium as it passes from chamber to chamber.

The minimum tip speed of the materials processor may be from about 30 ft/sec to 40 ft/sec to 50 ft/sec to even 60 ft/sec. The minimum shear rate of the materials processor may be from 2,000 $sec^{-1}$, to 5,000 $sec^{-1}$, 10,000 $sec^{-1}$, 20,000 $sec^{-1}$, 100,0000 $sec^{-1}$, even 500,000 $sec^{-1}$.

There are a variety of methods in which a drag reducing polymer can become agglomerated. Common ways of agglomerating a drag reducing polymer are improper storage temperature, insufficient agitation, extended storage time, or a combination of these.

The turbulent drag reducing agents of interest are suspensions of poly-alpha-olefin polymers in either aqueous or non-aqueous fluids. These poly-alpha-olefins have a very low glass transition temperature. Therefore at ambient temperature they become sticky and will agglomerate together. To avoid this agglomeration, partitioning agents or anti-agglomerating agents are added to the suspensions to retard agglomeration. There are a wide variety of these partitioning agents including materials such as metal stearates for aqueous suspensions and fatty-acid waxes for non-aqueous suspensions. Surfactants may also be utilized to aid in retarding agglomeration.

Upon aging it is not uncommon for polymer particles to agglomerate in spite of the presence of an anti-agglomerating (i.e. partitioning) agent. Typically this will not occur within the stated shelf life of the suspensions. Depending on the ambient temperature of the storage location, agglomeration may occur after 4 times the shelf life in a temperate zone region or after 2 times the shelf life in a tropical zone region. Many drag reducer suspensions being utilized in the industry have a stated shelf-life of 6 months.

Improper temperature conditions can include storage of a drag reducing polymer suspension that has been stored at a temperature above 90° F. for a certain period of time. The relationship of agglomerating the drag reducer with the temperature and the time that has elapsed can be exponential. The temperature relationship can depend upon the different material used to make the drag reducer such as non-aqueous or aqueous carrier fluids. In other embodiment improper temperature conditions include storage of the drag reducing polymer suspension at a temperature above 95° F., 100° F., 110° F., 120° F. for a certain period of time. The period of time can vary between a day, 2 days, 5 days, 2 weeks, 4 weeks, 2 months or longer.

Identifying the agglomerated drag reducer can be done through a variety of methods. One of the most common ways of identifying an agglomerated drag reducing polymer is through visual inspection. Agglomerations may appear as small lumps in the fluid stream as the drag reducer is poured from a container. A highly agglomerated drag reducer can appear to be non-homogeneous with curds or lumps visible on the suspension surface and can become difficult to pour from a container.

In one embodiment an agglomerated drag reducing polymer can be quantitatively identified when the agglomerated drag reducing polymer is incapable of being injected through an injection pump using ¼ to 1-inch diameter check valves without clogging the injection pump. Other method of quantitatively identifying an agglomerated drag reducing polymer include incapability of flowing through a 3 mm, 5 mm, or even 10 mm pore strainer without leaving any substantial solids residue. Substantial solids residue can be defined as solids accumulation to a level where it hinders the flow of drag reducer.

When the remediated drag reducer is produced the maximum particle size diameter is at least 5% smaller than that of the agglomerated drag reducing polymer. In alternate embodiments the maximum particle size diameter difference can be greater than 5%, 10%, 15%, 20%, 25%, 30% even 50%.

In an alternate embodiment the present method can teach a method of feeding to a materials processor a mixture containing an agglomerated drag reducer and at least one liquid. The mixture is then homogenized to produce a remediated drag reducer. The maximum particle size diameter of the agglomerated drag reducing polymer is at least 5% larger than the maximum particle diameter of the remediated drag reducer.

In this embodiment the at least one liquid is ideally a liquid that will not react negatively with the drag reducing polymer inhibiting its performance ability. One method of doing so includes using a liquid that is selected from a liquid component that was originally used to produce the agglomerated drag reducer.

Other liquids that can be used include performance enhancing liquids such as additional stabilizers such as metal stearate suspensions, metal free stabilizers, nonionic surfactants, ionic surfactants, non-solvent carrier fluids, and partitioning agents suspended in non-solvent carrier fluids. Stabilizers can include water, alcohols with one to eight carbon atoms, glycols, and mixtures thereof.

In yet another embodiment a composition is taught of a remediated drag reducer prepared by the process of feeding to a material processor a mixture of an agglomerated drag reducer and at least one liquid. The maximum particle size diameter of the agglomerated drag reducing polymer is at least 5% larger than the maximum particle diameter of the remediated drag reducer. In this embodiment the agglomerated drag reducing polymer was incapable of flowing though a 3 mm pore strainer basket without leaving any substantial solids residue and incapable of being injected through an injection pump using ¼ to 1 inch diameter check valves without clogging the injection pump.

The following examples of certain embodiments of the invention are given. Each example is provided by way of explanation of the invention, one of many embodiments of the invention, and the following examples should not be read to limit, or define, the scope of the invention.

Example 1

A drag reducing polymer was tested for agglomerated particles by flowing the polymer suspension through a 3 mm pore strainer After 5 minutes the strainer was clogged and it was quantitatively determined that the drag reducing polymer was agglomerated. An in-line homogenizer was utilized to reduce the maximum particle size diameter of the drag reducing polymer suspension and produce a remediated drag reducer. The remediated drag reducer was pumped through the same 3 mm pore strainer for over 4 hours without any substantial buildup in the strainer.

FIG. 1 depicts a particle size distribution overlay of the agglomerated drag reducer and the remediated drag reducer.

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A method comprising:
   forming a drag reducing polymer;
   storing the drag reducing polymer, wherein an agglomerated drag reducing polymer is formed during storage;
   feeding a mixture comprising the agglomerated drag reducing polymer to an inline materials processor;
   homogenizing the mixture using the inline materials processor to produce a remediated drag reducing polymer, wherein homogenizing the mixture is performed inline of an injection pump; and
   supplying the remediated drag reducing polymer into a pipeline using the injection pump,
   wherein a maximum particle size diameter of the agglomerated drag reducing polymer is at least 5% larger than a maximum particle size diameter of the remediated drag reducing polymer.

2. The method of claim 1, wherein the agglomerated drag reducing polymer is incapable of flowing through a 10 mm pore filter without leaving any substantial solids residue.

3. The method of claim 1, wherein the agglomerated drag reducing polymer is incapable of flowing through a 3 mm pore filter without leaving any solids residue.

4. The method of claim 1, wherein the agglomerated drag reducing polymer is incapable of being injected through an injection pump using ¼ to 1 inch diameter check valves without clogging the injection pump.

5. The method of claim 1, wherein a minimum shear rate of the inline materials processor is 2,000 sec$^{-1}$.

6. A method, comprising:
   forming a drag reducing polymer;
   storing the drag reducing polymer for at least one year or at a temperature above 90 degrees Fahrenheit, wherein an agglomerated drag reducing polymer is formed during storage;
   feeding a mixture comprising the agglomerated drag reducing polymer and at least one liquid to an inline materials processor;
   homogenizing the mixture using the inline materials processor to produce a remediated drag reducing polymer, wherein the homogenizing the mixture is performed inline of an injection pump, wherein a maximum particle size diameter of the agglomerated drag reducing polymer is at least 5% larger than a maximum particle size diameter of the remediated drag reducing polymer; and
   supplying the remediated drag reducing polymer into a pipeline using the injection pump.

7. The method of claim 6, wherein the agglomerated drag reducing polymer is incapable of flowing through a 10 mm pore filter without leaving any substantial solids residue.

8. The method of claim 6, wherein the agglomerated drag reducing polymer is incapable of flowing through a 3 mm pore filter without leaving any substantial solids residue.

9. The method of claim 6, wherein the agglomerated drag reducing polymer is incapable of being injected through an injection pump using ¼ to 1 inch diameter check valves without clogging the injection pump.

10. The method of claim 6, wherein the at least one liquid is selected from a liquid component used to manufacture the agglomerated drag reducing polymer.

11. The method of claim 6, wherein the at least one liquid is a stabilizer.

12. The method of claim 6, wherein a minimum shear rate of the inline materials processor is 2,000 sec$^{-1}$.

13. A method comprising:
    forming a drag reducing polymer;
    storing the drag reducing polymer;
    feeding the drag reducing polymer to an inline materials processor; homogenizing the drag reducing polymer using the inline materials processor to produce a remediated drag reducing polymer, wherein the homogenizing the drag reducing polymer is performed inline of an injection pump; and
    supplying the remediated drag reducing polymer into a pipeline using the injection pump.

14. The method of claim 12, wherein the drag reducing polymer comprises agglomerated drag reducing polymer.

15. The method of claim 12, further comprising feeding at least one liquid with the drag reducing polymer to the inline materials processor.

16. The method of claim 15, wherein the at least one liquid comprises a nonionic surfactant, an ionic surfactant, a partitioning agent, water, alcohol having one to eight carbon atoms, glycols, or mixtures thereof.

* * * * *